(12) United States Patent
Favilla et al.

(10) Patent No.: US 11,035,672 B2
(45) Date of Patent: Jun. 15, 2021

(54) SENSING OF A MAGNETIC TARGET

(71) Applicant: The Boeing Company, Chicago, IL (US)

(72) Inventors: Stephan Joel Favilla, Monroe, WA (US); Alan Ray Merkley, Greenbank, WA (US)

(73) Assignee: The Boeing Company, Chicago, IL (US)

(*) Notice: Subject to any disclaimer, the term of this patent is extended or adjusted under 35 U.S.C. 154(b) by 1113 days.

(21) Appl. No.: 14/710,555

(22) Filed: May 12, 2015

(65) Prior Publication Data

US 2016/0334212 A1  Nov. 17, 2016

(51) Int. Cl.
| | | |
|---|---|---|
| *G01C 17/28* | (2006.01) |
| *H01F 7/02* | (2006.01) |
| *G01D 5/16* | (2006.01) |
| *G01V 15/00* | (2006.01) |
| *G01V 3/08* | (2006.01) |

(52) U.S. Cl.
CPC .............. *G01C 17/28* (2013.01); *G01D 5/16* (2013.01); *G01V 3/081* (2013.01); *G01V 15/00* (2013.01); *H01F 7/0278* (2013.01)

(58) Field of Classification Search
CPC .............................. G01C 17/28; H01F 7/0278
See application file for complete search history.

(56) References Cited

U.S. PATENT DOCUMENTS

| | | | |
|---|---|---|---|
| 1,971,189 A | 8/1934 | Leibing | |
| 5,559,432 A * | 9/1996 | Logue | B82Y 15/00 244/234 |
| 5,675,488 A | 10/1997 | McElhinney | |
| 6,927,560 B2 | 8/2005 | Pedigo et al. | |
| 7,298,137 B2 | 11/2007 | Howard et al. | |
| 7,319,319 B2 | 1/2008 | Jones et al. | |
| 7,420,376 B2 | 9/2008 | Tola et al. | |
| 7,498,796 B2 | 3/2009 | Georgeson et al. | |
| 7,514,919 B2 | 4/2009 | James et al. | |
| 7,768,249 B2 | 8/2010 | Georgeson et al. | |
| 7,768,250 B2 | 8/2010 | Georgeson et al. | |

(Continued)

FOREIGN PATENT DOCUMENTS

| | | |
|---|---|---|
| JP | 2007504461 A | 3/2007 |
| WO | 8802852 A1 | 4/1988 |
| WO | 2014209516 A1 | 12/2014 |

OTHER PUBLICATIONS

Liang etal, GaussBrush: Drawing with Magnetic Stylus, 2012. (Year: 2012).*

(Continued)

*Primary Examiner* — Regis J Betsch
*Assistant Examiner* — Jeremy A Delozier
(74) *Attorney, Agent, or Firm* — von Briesen & Roper, s.c.

(57) ABSTRACT

An apparatus comprises a magnetic target for generating a magnetic field that is uniform and concentric about a central axis of the target; an array of three-axis digital magnetic compasses for sensing the magnetic field; and a processor for finding intersection points of vectors from the compasses to the target. The vectors lie in a global X-Y plane that is normal to the central axis. Each vector indicates a direction of sensed magnetic field from one of the compasses to the magnetic target.

20 Claims, 6 Drawing Sheets

(56) References Cited

U.S. PATENT DOCUMENTS

| | | | | |
|---|---|---|---|---|
| 2003/0023380 A1* | 1/2003 | Woloszyk | ............. | G01C 17/38 |
| | | | | 701/530 |
| 2003/0210027 A1 | 11/2003 | Pedigo et al. | | |
| 2005/0052898 A1 | 3/2005 | Arntson | | |
| 2008/0048635 A1* | 2/2008 | Hughes | ................... | B21J 15/28 |
| | | | | 324/67 |
| 2008/0103350 A1* | 5/2008 | Farone | .................. | A61N 2/006 |
| | | | | 600/13 |
| 2008/0186018 A1* | 8/2008 | Anderson | ............. | G01B 7/004 |
| | | | | 324/207.11 |
| 2010/0324862 A1* | 12/2010 | Sato | ....................... | G01C 17/38 |
| | | | | 702/150 |
| 2015/0003927 A1 | 1/2015 | Spishak et al. | | |

OTHER PUBLICATIONS

Three-Axis Magnetic Sensor Hybrid HMC2003, Honeywell Sensor Products (Oct. 1997).
Office Action for related Canadian Application No. 2,924,782; report dated Dec. 18, 2018.
Office Action for related Chinese Application No. 201610310756.5; report dated May 30, 2019.
Office Action for related Japanese Application No. 2016-094293; report dated Feb. 4, 2020.
Search Report for related European Application No. 16159721.6; report dated Oct. 7, 2016.

\* cited by examiner

SENSING OF A MAGNETIC TARGET

BACKGROUND

A magnetic target and sensor array may be used to locate a hidden feature behind a non-magnetic wall. The magnetic target is placed at the feature behind the wall, and the sensor array is scanned over a front surface of the wall. Flux lines from the magnetic target are sensed by the sensor array.

Each sensor of the array may use absolute field strength as a measurement of a position of a magnetic field. A relative position of the magnetic target may be inferred by determining differences in measured magnetic field strength between different pairs of sensors, and using the differences to triangulate the relative position of the magnetic target.

Generally, the difference in sensed field strength is proportional to the distance of the array to the magnetic target, but that is not always the case. If the magnetic target produces a weak field, or if both sensors in a pair are very far from the magnetic target, the difference appears weak. Positioning errors can result, as the array may appear to be further from the magnetic target than it actually is.

SUMMARY

According to an embodiment herein, an apparatus comprises a magnetic target for generating a magnetic field that is uniform and concentric about a central axis of the target, an array of three-axis digital magnetic compasses for sensing the magnetic field, and a processor for finding intersection points of vectors from the compasses to the target. The vectors lie in a global X-Y plane that is normal to the central axis. Each vector indicates a direction of sensed magnetic field from one of the compasses to the magnetic target.

According to another embodiment herein, a robot system comprises first and second robots for performing a manufacturing operation on a non-magnetic structure. The first robot includes a magnetic target for generating a magnetic field that is uniform and concentric about a central axis of the target, and a first end effector and positioning system for positioning the magnetic target at a first side of the structure. The second robot includes a sensing array of three-axis digital magnetic compasses for sensing the magnetic field, a manufacturing tool, and a second end effector and positioning system for scanning the sensing array along a surface of a second, opposite side of the structure to locate the magnetic target. The second robot further includes a processor for finding intersection points of vectors from the compasses to the magnetic target. The vectors lie in a global X-Y plane. Each vector indicates a direction of sensed magnetic field from one of the compasses to the target. The second robot uses the intersection points to position the manufacturing tool with respect to the magnetic target.

According to another embodiment herein, a magnetic target comprises a cylindrical ferromagnetic core, a torroidal magnet surrounding the core, and a focusing cone about the core and adjacent to the torroidal magnet.

According to another embodiment herein, a method of locating a hidden feature behind a non-magnetic structure comprises placing a magnetic target at the feature, scanning a front of the structure using an array of three-axis digital magnetic compasses, and computing a direction vector from each compass to the magnetic target. Each direction vector lies in an X-Y plane that is normal to a centerline of the magnetic target. The method further comprises finding intersection points of the direction vectors, using the intersection points to compute an offset vector from the target to a reference point, and using the offset vector to move the reference point.

These features and functions may be achieved independently in various embodiments or may be combined in other embodiments. Further details of the embodiments can be seen with reference to the following description and drawings.

DETAILED DESCRIPTION

Figure 1:
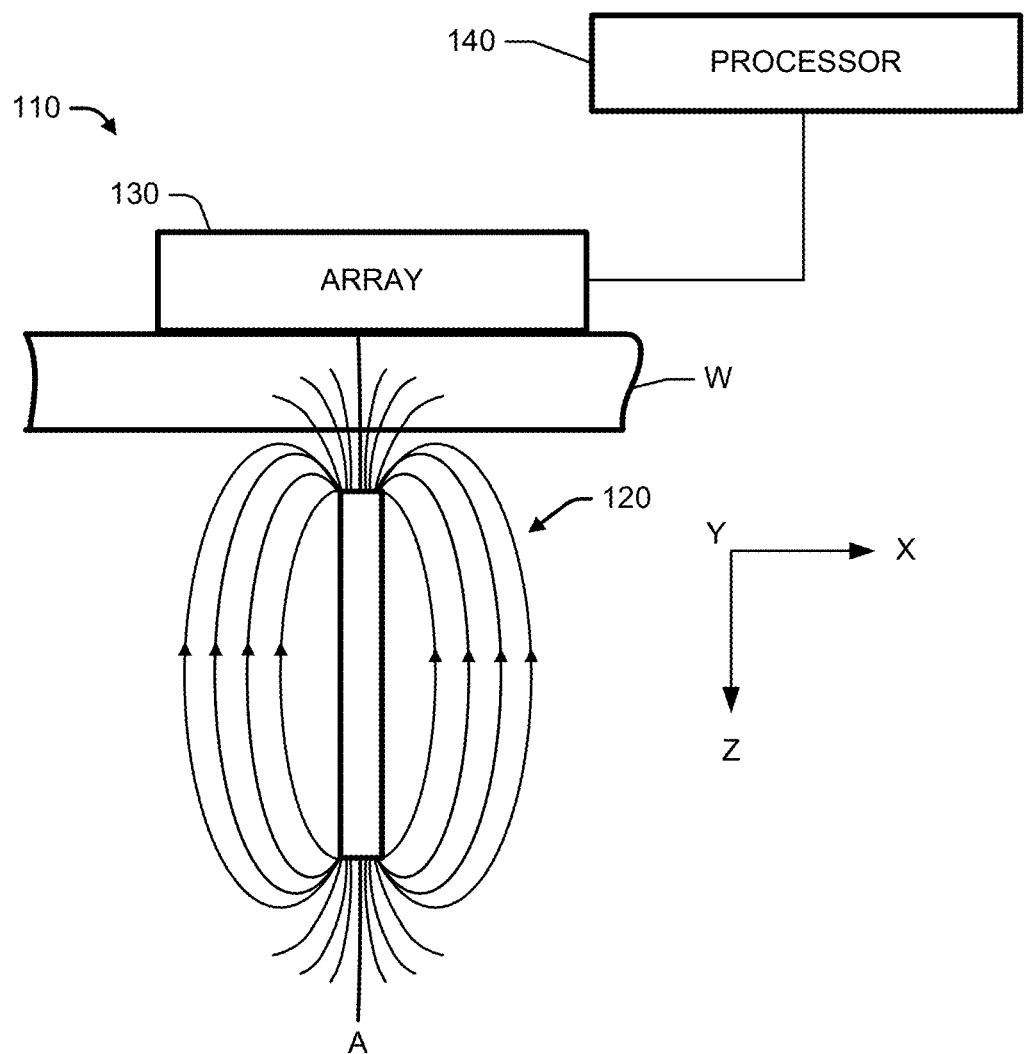
FIG. 1 is an illustration of an apparatus including a magnetic target and an array of three-axis digital magnetic compasses.

Reference is made to FIG. 1, which illustrates an apparatus 110 including a magnetic target 120 for generating a magnetic field that is fairly uniform and concentric about its central axis (A). Flux lines radiate outward from the magnetic target 120.

The magnetic target 120 defines global X-, Y-, and Z-axes, which form a global coordinate system. The Z-axis is coincident with the central axis (A) of the magnetic target 120, and a global X-Y plane is formed by the X- and Y-axes. The global X-Y plane is normal to the central axis (A). When viewed in the global X-Y plane, the flux lines are assumed to be straight, given that the magnetic field is fairly uniform and concentric.

The apparatus 110 further includes an array 130 of three-axis digital magnetic compasses for sensing the magnetic field. Each digital magnetic compass senses the magnetic field along its local a-, b- and c-axes, which form a local coordinate system. For instance, each digital magnetic compass includes a sensor for sensing a magnetic component along each local axis. If the three sensors are nearly stacked on top of one another (which is typical in a conventional digital magnetic compass), the same magnetic field will influence all three sensors. Each magnetic sensor may include a magnetoresistive device whose resistance changes in response to an applied magnetic field. Each digital magnetic compass may also include interface electronics for providing digital values of magnetic field strength and direction.

Figure 2:
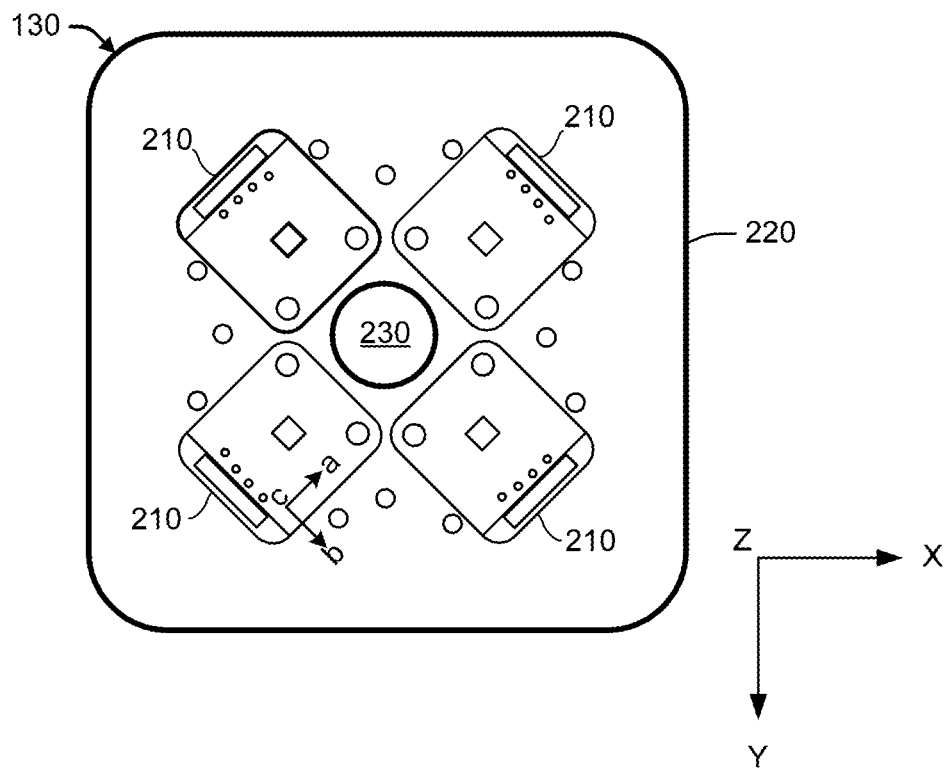
FIG. 2 is an illustration of an example of the array.

Additional reference is made to FIG. 2, which illustrates an example of the array 130. The array 130 of FIG. 2 includes four three-axis digital magnetic compasses 210 on a substrate 220 such as a circuit board. The digital magnetic compasses 210 are arranged at vertices of a square. An opening 230 is at a center of the substrate 220, and a reference point is at a center of the opening 230.

The local a-, b- and c-axes of each digital magnetic compass 210 need not be aligned with the global X-, Y- and Z-axes. In FIG. 2, for instance, the local a- and b-axes are rotated 45 degrees about the local c-axis to simplify the computations involved with transforming the measurements from the local coordinate system to the global coordinate system, and also for determining the position of the magnetic target 120.

During a sensing operation, the magnetic target 120 is placed behind a surface of a non-magnetic structure (W), and the array 130 is moved along a front surface of the structure (W). Each digital magnetic compass 210 measures magnetic field strength along its a-, b- and c-axes.

The apparatus 110 further includes a processor 140. For each digital magnetic compass, the processor 140 computes a vector in the global X-Y plane that goes from the digital magnetic compass 210 towards the magnetic target 120.

The processor 140 utilizes the directions of these vectors to determine the position of the magnetic target 120, but it does not utilize absolute magnetic strength of the vectors. Hence, these vectors will hereinafter be referred to as "direction vectors."

The processor 140 finds intersection points of the direction vectors in the global X-Y plane. The intersection points indicate the position of the magnetic target 120 relative to the digital compasses 210. From this relative position, an offset vector may be derived. For instance, the offset vector identifies a distance and direction from a reference point.

For instance, the opening 230 in FIG. 2 allows a drill bit to pass through the substrate 220. The center of the opening 230 represents the center of a drill bit. Thus, the center of the opening 230 also represents the reference point. The offset vector may represent the distance and direction that the drill bit should be moved to place it over the magnetic target 120.

Figure 3:
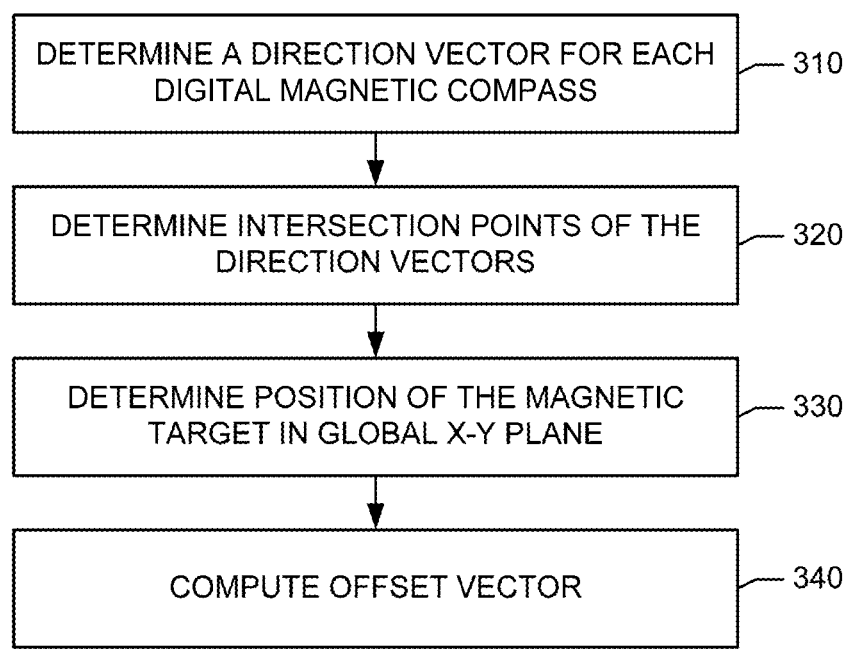
FIG. 3 is an illustration of a method of determining the position of the magnetic target with respect to the array.

Reference is now made to FIG. 3, which illustrates an example of how the direction vectors may be computed and then used to determine the position of the magnetic target 120 relative to the digital magnetic compasses 210.

At block 310, a direction vector for each digital magnetic compass 210 is determined. Each digital magnetic compass 210 senses components of the magnetic field along the a- and b-axes (the a- and b-components), and the processor 140 determines the direction vector to the magnetic target 120 as a function of the a- and b-components.

At block 320, the direction vectors in the local coordinate systems are transformed to direction vectors in the global X-Y plane. The intersection points of the direction vectors in the global X-Y plane are determined.

Figure 4A:
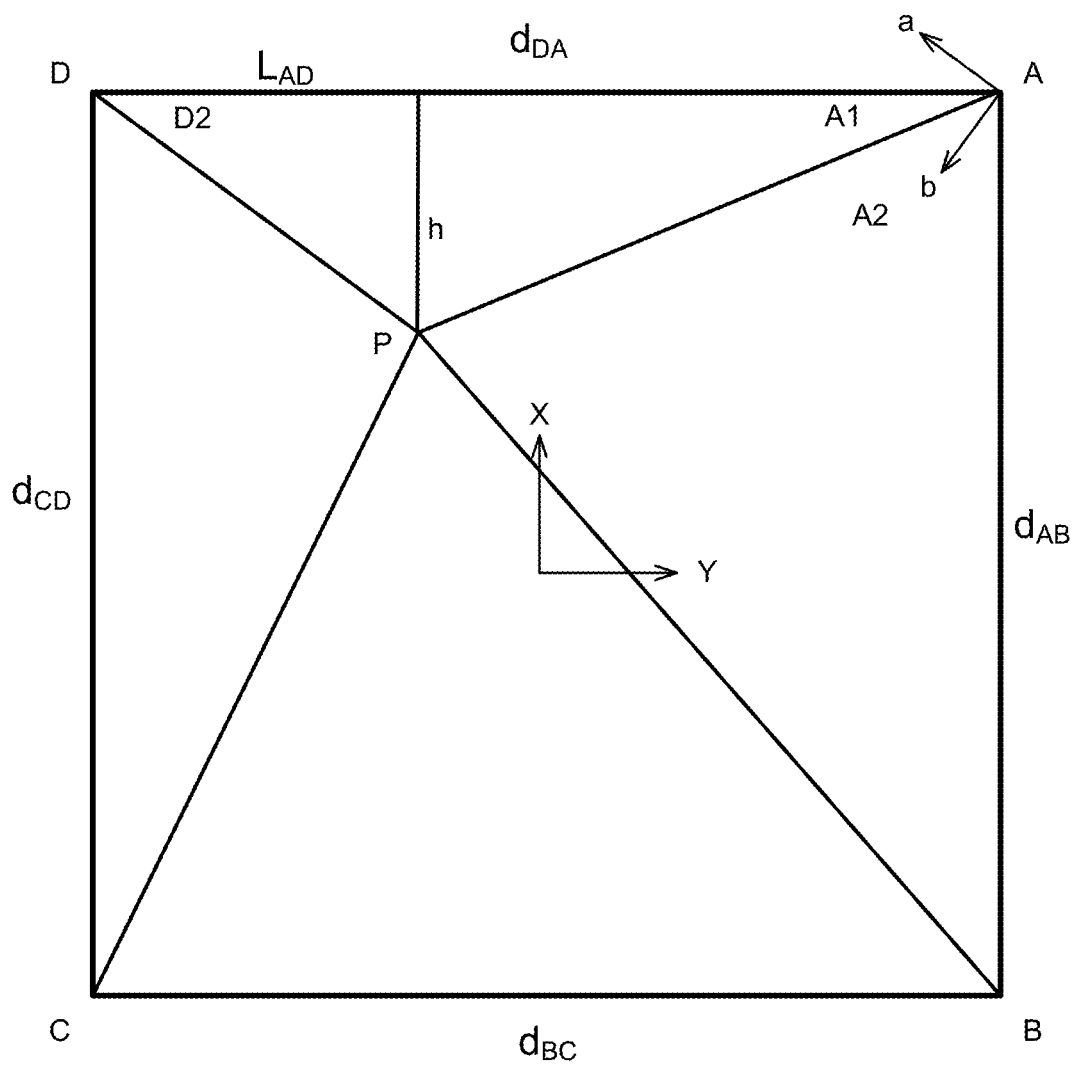
FIG. 4A is an illustration of a method of determining intersections of direction vectors.

FIG. 4A provides an example of how the direction vectors and intersection points may be determined for an array 130 having the configuration illustrated in FIG. 2. The digital magnetic compasses 210 are at corners A, B, C and D. The magnetic target 120 is at position P.

At each corner are a- and b-axes of a local coordinate system. The global X-Y plane is defined by the X- and Y-axes.

Since the flux lines in the local a-b plane appear straight, they intersect the digital magnetic compasses 210 at the same angle, regardless of magnet strength. If the magnetic field radiates outward from a tip of the magnetic target 120, deviations in the axis do not significantly affect the direction.

There is a pair of complementary angles for each corner: A1 and A2 for corner A, B1 and B2 for corner B, C1 and C2 for corner C, and D1 and D2 for corner D. There are also four center angles at position P: $\angle APB$, $\angle BPC$, $\angle CPD$, and $\angle DPA$. Each angle is formed by two direction vectors, and point P lies at the intersection of the two direction vectors.

The complementary angles for each corner may be found using the a- and b-components of the sensed magnetic field. For instance, the angles A1 and A2 may be computed from the a-component (a) and the b-component (b) sensed at corner A as follows:

$$A1 = a\tan(b/a) - \pi/4.$$

$$A2 = \pi/2 - A2.$$

The center angles are then computed. For instance, the center angle $\angle DPA$ is computed as $\angle DPA = \pi - (D2 + A1)$.

The in-plane lengths of the line segments AP, BP, CP and DP are computed. Ideally, all direction vectors would intersect at the position P of the magnetic target 120. However, due to various factors including misalignments and deviations in the axis, they don't. As a result, the vectors intersect at different intersection points.

As a result, there may be two solutions for each in-plane length: AP1, AP2, BP1, BP2, CP1, CP2, DP1 and DP2. Each length may be determined using the law of sines. For instance, $$AP1 = d_{AB} * \sin(D2)/\sin(\angle DPA).$$

$$AP2 = d_{AB} * \sin(B1)/\sin(\angle DPA).$$

where $d_{AB}$ is the known distance between corners A and B. Distance $d_{AB}$ should be the same as distances $d_{BC}$, $d_{CD}$, and $d_{DA}$.

The position P of the magnetic target in the global X-Y plane is then determined. First, the height h of each center triangle is found. For instance, the height h of the center angle $\angle DPA$ may be found as $h = DP2 * \sin(D2)$.

The distance $L_{AD}$ and the global coordinates $Y_P$ and $X_P$ of the magnetic target 120 at position P may be computed as follows.

$$Y_P = d_{AB}/2 - h.$$

$$L_{AD} = DP2 * \cos(D2).$$

$$X_P = \text{distance}/2 + L_{AD}.$$

The reason $d_{AB}/2$ is used is because the height (h) of the center angle $\angle DPA$ is computed, then that height (h) is subtracted from the distance from the X axis (Y=0) to the line segment DA.

Thus, the in-plane length of each line segment AP, BP, CP and DP is computed as the distance from a magnetic compass to its intersection point. Therefore, the intersections will yield four values for X and Y. The use of intersections of opposing sensors is avoided because the directions are almost parallel when the magnetic target 120 is at the center of the array 130.

Reference is once again made to FIG. 3. At block 330, the position of the magnetic target 120 in the global X-Y plane is determined. For example, a statistical measure (e.g., an average) of the in-plane distances is computed.

The processor 140 may use a statistical measure such as a standard deviation to measure confidence in the computed position of the magnetic target 120. A bad sensor, iron effects, or singularities in the calculated position may cause a large variance.

Thus, the processor 140 does not rely on magnitudes of the vectors to determine the position of the target. That is, the processor 140 does not rely on the field strength of the vector because the a- and b-components of the magnetic field strengths will scale with each other, yielding the same direction, regardless of the magnetic strength (to the point of sensor saturation, or sensor drop-out).

Figure 4B:
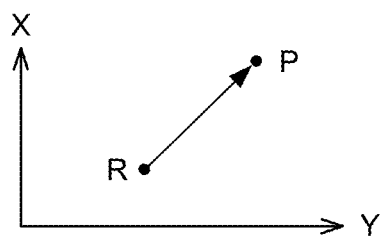
FIG. 4B is an illustration of an offset vector.

At block 340, an offset vector may be determined. Position P of the magnetic target 120 was just computed, and position R of the reference point in the global X-Y plane is known. The offset vector may indicate the distance and direction from the reference point R to the magnetic target 120 (see FIG. 4B).

Although the examples above involve an array 130 having four digital magnetic compasses 210, the array 130 is not so limited. The array 130 has at least two digital magnetic compasses, since as few as two directions vectors are needed to identify an intersection point. However, singularities are formed if the magnetic target 120 is directly between two compasses, whereby no intersection point is identified, or the intersection point is far from the magnetic target 120. The use of additional digital magnetic compasses reduces the possibility of a singularity. A total of four digital magnetic compasses has been found to adequately reduce this possibility. Even if one measurement is discarded as an outlier, the remaining measurements can still avoid a singularity.

The processor 140 is not limited to computing only the position of the magnetic target 120 in the global X-Y plane. The processor 140 may also compute a depth of the magnetic target 120.

Figure 5A:
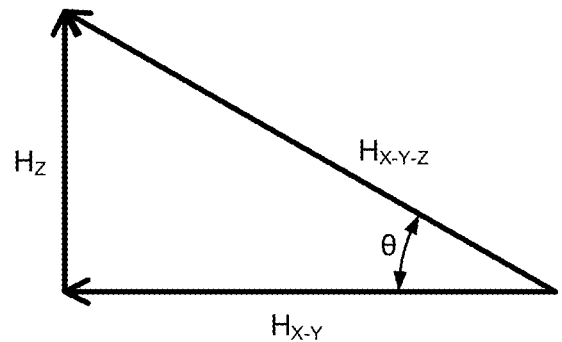
FIGS. 5A and 5B are illustrations of a method of computing depth of the magnetic target.

The processor 140 may determine the depth of the magnetic target 120 by utilizing the z-component ($H_Z$) of at least one of the digital magnetic compasses. As illustrated in FIG. 5A, the field strength ($H_{X-Y}$) in the global X-Y plane is computed, the total field strength ($H_{X-Y-Z}$) from all three sensors is computed, and the inverse tangent is computed to determine an angle ($\theta$) of the magnetic target.

Figure 5B:
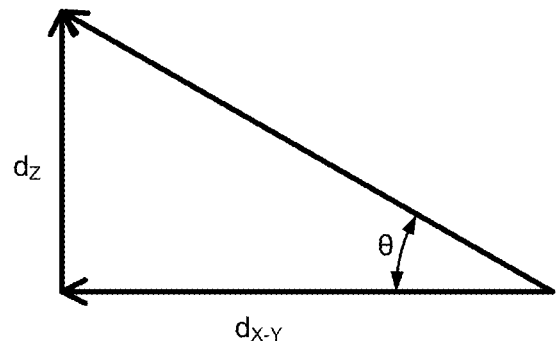

As illustrated in FIG. 5B, the angle ($\theta$) of the magnetic target is then used to determine the depth. Since the in-plane distance ($d_{X-Y}$) to the magnetic target was previously determined, the depth ($d_Z$) may be computed as the product of the in-plane distance and the $\tan(\theta)$.

Expanding upon the example of FIG. 4A, a depth for each in-plane distance of the line segments AP1, AP2, BP1, BP2, CP1, CP2, DP1 and DP2 is computed. Resulting is a total of eight depths. An average or other statistical measure of the depths may be computed to determine depth of the magnetic target 120.

Sensor measurements in the array 130 may be affected by field effects due to the Earth's magnetic field or nearby iron. The processor 140 may use measurements from an additional three-axis digital magnetic compass to compensate for these effects. The additional magnetic compass is located away from magnetic target 120 so as not to sense the magnetic field from magnetic target 120. For instance, the target's magnet field drops off exponentially such that it is nearly zero approximately eight inches from the central axis. Since the Earth's magnetic field is rather uniform, and iron effects due to large iron structures (e.g., due to steel in a building or an assembly jig) is also uniform, the additional digital compass will sense the a-, b- and c-components of this stray field only. These components may be transformed onto the local coordinate systems of each of the compasses and then subtracted from the respective components measured by the digital magnetic compasses.

The apparatus 110 is not limited to a specific type of magnetic target 120. However, a magnetic target 120 having a cylindrical ferromagnetic core and a torroidal magnet surrounding the core is particularly beneficial.

Figure 6A:
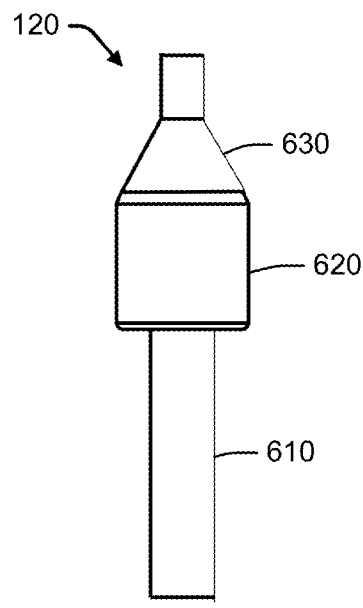
FIGS. 6A-6C are illustrations of an example of the magnetic target.

FIG. 6A is an illustration of an example of the magnetic target 120. The magnetic target 120 of FIG. 6 includes a cylindrical ferromagnetic core 610 and a torroidal magnet 620 surrounding the core 610. A ferromagnetic focusing cone 630 is disposed about the core 610 and adjacent to the torroidal magnet 620. The flux from the magnet 620 flows through the focusing cone 630 instead of surrounding air. In this manner, the focusing cone 630 focuses the magnetic field to improve flux density and uniformity of the field at the tip of the focusing cone 630.

Figure 6B:
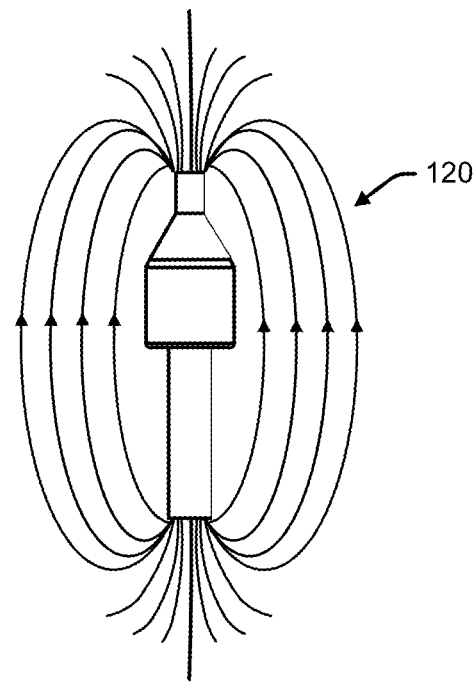

As illustrated in FIG. 6B, the ferromagnetic core 610 absorbs the magnetic field, and projects it axially to the magnet 620, thus aligning the magnetic field with the physical body of the magnet 620. This reduces error induced by misalignment. The high permeability of the core 610 also helps to homogenize the magnetic field.

Figure 6C:
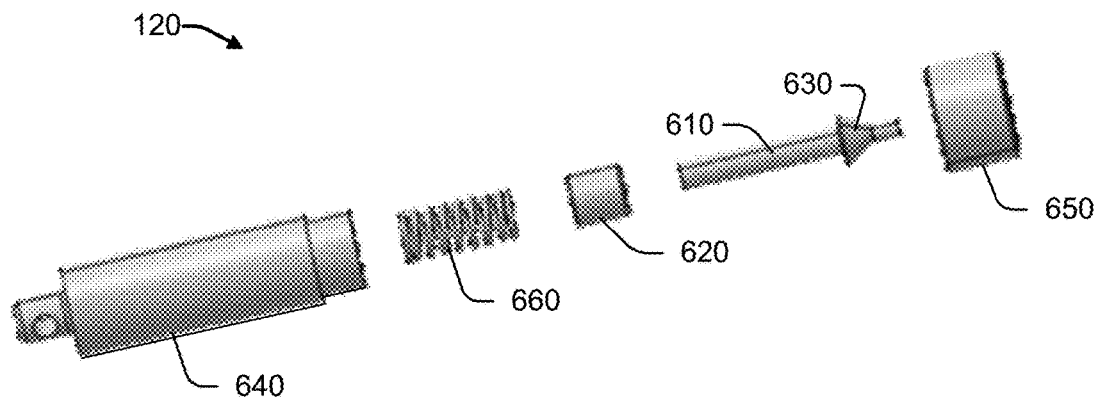

Reference is made to FIG. 6C, which illustrates an example of components for the magnetic target 120 of FIG. 6A. The core 610 and the focusing cone 630 form a unitary structure. The magnet 620 slides onto the core 10. The magnetic target 120 further includes a housing 640 and end cap 650. The core 610, magnet 620 and focusing cone 630 are enclosed within the housing 640 and end cap 650. The housing 640 and end cap 650 may have the shape of a shear pin for insertion into a pilot hole.

The core 610 may extend through an opening in the end cap 650. A spring 660 within the housing 640 may outwardly bias the magnet 620 towards the end cap 650. This spring-loaded configuration is advantageous for drilling and other operations wherein an object passes through the structure. For instance, the magnetic target 120 of FIGS. 6A-6C may remain in a pilot hole while drilling is being performed. If the drill bit passes through and extends beyond the structure, the drill bit will depress the core 610, magnet 620 and focusing cone 630.

The apparatus 110 may be used manually. For example, the apparatus 110 may further include a hand tool (not shown), and the array 130 and processor 140 may be integrated with the hand tool. The hand tool may be scanned across the front surface of a structure. The processor 140 may send the offset vector and other information to a visual display on the tool. An operator can use this information to manually position the hand tool over the magnetic target 120.

However, due to automatic computation of the position of the magnetic target 120 and computation of the offset vector, the apparatus 110 is especially suited for robotic operation. For example, a pair of robots may use the apparatus 110 to perform a manufacturing operation.

Figure 7:
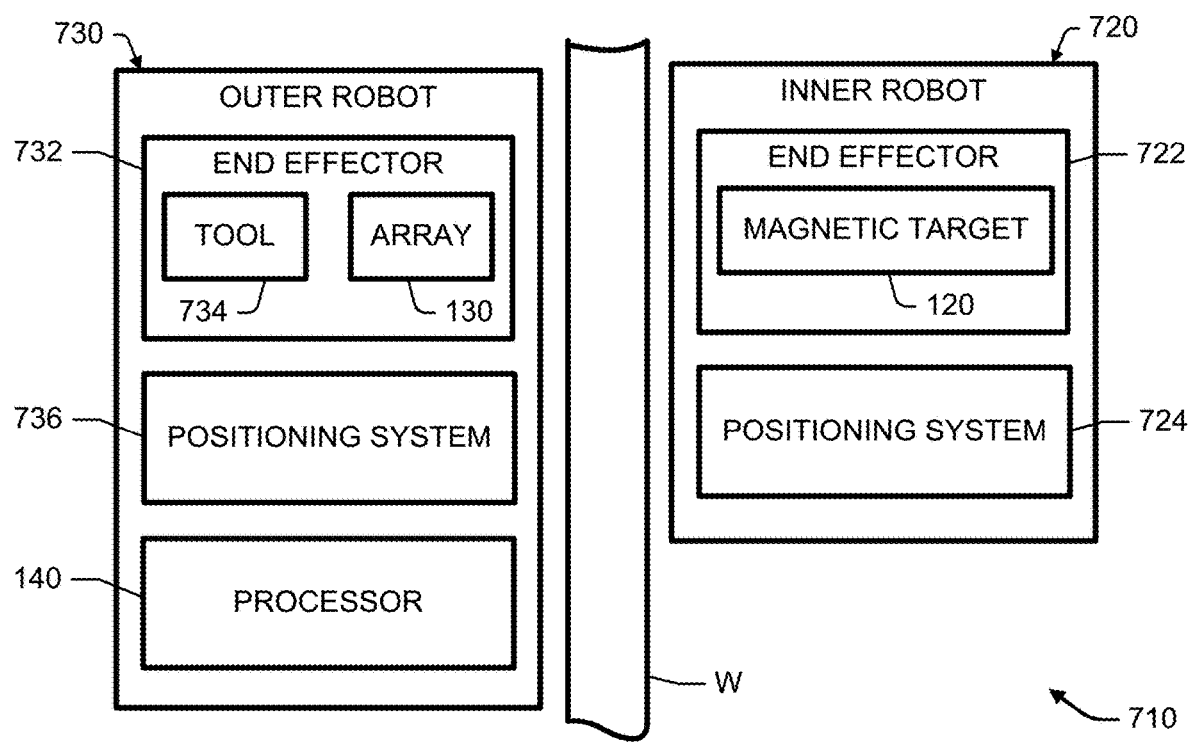
FIG. 7 is an illustration of a robot system including a magnetic target and an array of three-axis digital magnetic compasses.

FIG. 7 illustrates a robot system 710 for performing manufacturing operations on opposite sides of a non-magnetic wall (W). The robot system 710 includes inner and outer robots 720 and 730 that operate synchronously on opposite sides of the wall (W). The inner robot 720 includes the magnetic target 120, which may be part of an end effector 722. The inner robot 720 further includes a positioning system 724 for moving the end effector 722 along an inner surface of the wall (W) to position the magnetic target 120. The magnetic target 120 may be held in position by the end effector 722 and positioning system 724, or it may be secured to a feature at the inner surface of wall (W) (e.g., inserted in a hole in a part that is against the inner surface).

The outer robot 730 includes the processor 140 and the array 130. The array 130 may be part of an end effector 732. The end effector 732 also includes a manufacturing tool 734. The outer robot 730 further includes a positioning system 736 for moving the end effector 732 along an outer surface of the wall (W). The additional compass for measuring stray fields may also be carried on the outer robot 730.

The array 130 may be integrated with the manufacturing tool 734. For instance, if the manufacturing tool 734 includes a drill, the array 130 may be integrated in a spindle of the drill.

Figure 8:
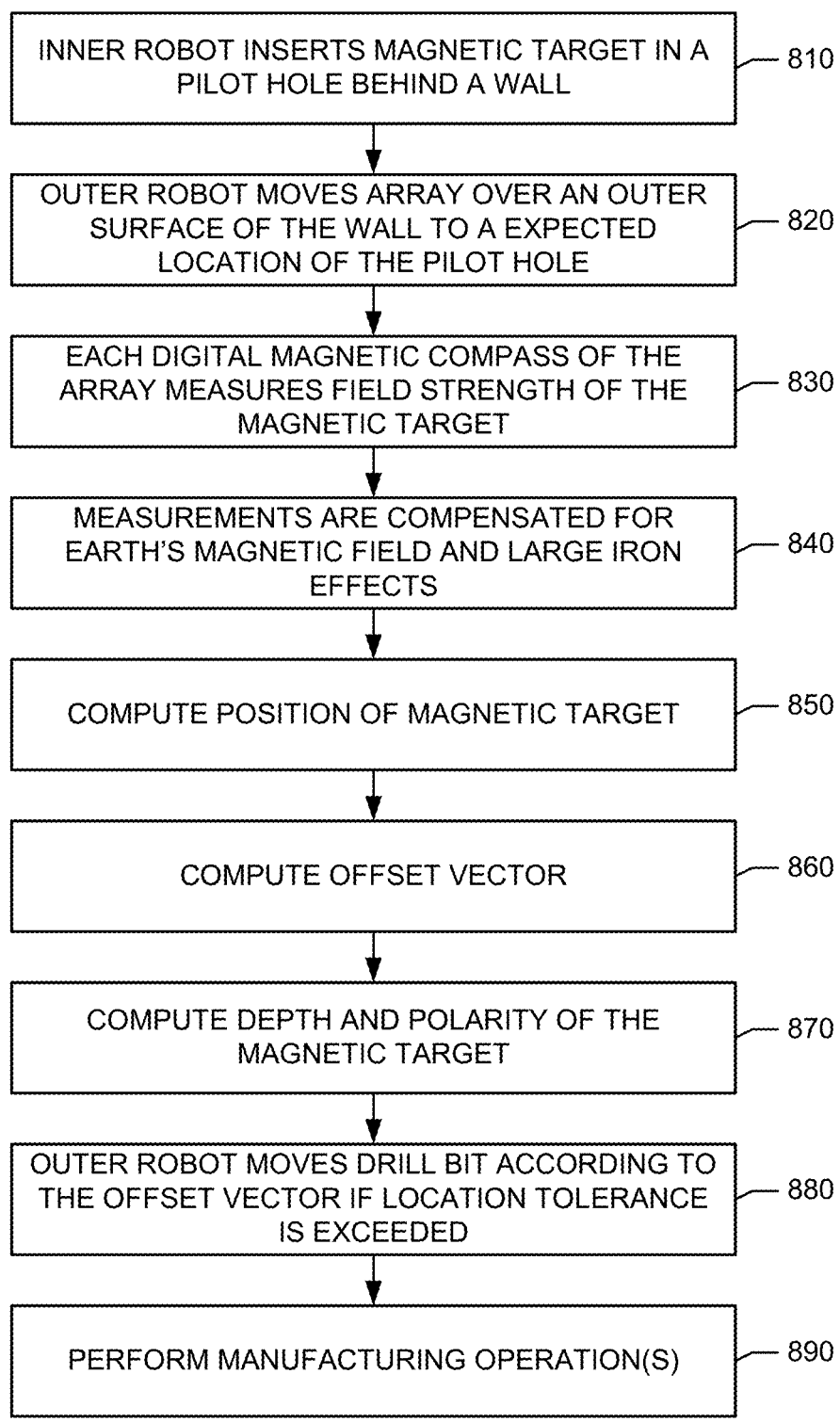
FIG. 8 is an illustration of a method of using the robot system to perform a manufacturing operation.

FIG. 8 illustrates a method of using the robot system 710 to drill a hole through the wall (W) and into a blind pilot hole. The pilot hole is located in a part (not shown) on an inner side of the wall (W). As but one example, the wall (W) is formed by aircraft skin, and the part includes a stiffener located against an inner surface of the aircraft skin. The stiffener contains the pilot hole.

At block 810, the inner robot 720 moves its end effector 722 to insert the magnetic target 120 in the pilot hole. At block 820, the outer robot 730 located on an outer side of the wall (W) moves the array 130 over an outer surface of the wall (W) to an expected position of the pilot hole. As a first example, the inner robot 720 is programmed to move its end effector 722 over the expected position of the pilot hole, and the outer robot 730 is programmed to move its end effector 732 over the expected position of the pilot hole. As a second example, the inner robot 720 moves its end effector 722 from a current position to a second position at which the magnetic target 120 is placed in the pilot hole. The inner robot 720 also determines a movement vector from the current position to the second position. The inner robot 720 communicates the movement vector to the outer robot 730, and the outer robot 730 uses the movement vector to move its end effector 732.

At block 830, each digital magnetic compass of the array 130 measures field strength of the magnetic target 120. At block 840, the measurements are compensated for the Earth's magnetic field and large iron effects.

At block 850, the processor 140 computes locations of intersection points of direction vectors in the global X-Y plane. From these intersection points, the processor computes a position of the magnetic target 120 in the global X-Y plane.

At block 860, the processor 140 computes an offset vector from the global position of the magnetic target 120 to a global position of a reference point. If the reference point corresponds to the centerline of a drill bit, the offset vector may indicate where the drill bit should be moved, or it may verify that the drill bit is directly over the magnetic target 120.

At block 870, additional information such as depth and polarity of the magnetic target 120 may be computed. The magnetic target has north and south poles. When the magnetic target 120 is inserted in the pilot hole, one of the poles is closer to the array 130 than the other one of the poles. The processor 140 may determine the polarity of the magnetic target 120 by checking the polarity of the z-component of each of the digital magnetic compasses.

At block 880, if the offset vector indicates that the distance between the magnetic target 120 and the reference point exceeds a threshold (that is, a location tolerance is exceeded), the outer robot 730 moves the reference point according to the offset vector. Blocks 830-880 may be repeated until the location tolerance is acceptable.

Once the location tolerance is acceptable, a manufacturing operation is performed (block 890). The drill bit is used to drill through the skin and into the pilot hole.

Additional manufacturing operations may be performed. For example, after the hole has been drilled through the aircraft skin, the inner robot 720 removes the magnetic target 120, the outer robot 730 inserts a fastener through the drilled hole, and the inner robot 720 terminates the fastener.

The information about the polarity may be used to determine whether a correct magnetic target is installed. Polarity information may also assist the manufacturing operation. Polarity information of different magnets may be used, for example, to signal a machine to use a different drill process (different drill speed, feed speed, peck cycle, etc), depending on the polarity seen by the array 130.

The information about depth of the magnetic target may be used to determine depth of the drilling. If the magnetic target 120 of FIGS. 6A-6C is used, the depth measurement need not be precise, as the drill bit will displace the spring-biased magnet after drilling through the structure.

Still, information about depth may also be used to determine a drill cycle. Drilling to a desired depth instead of drilling past the depth can reduce cycle time.

The invention claimed is:

1. Apparatus comprising:
a magnetic target for generating a magnetic field that is uniform and concentric about a central axis of the target;
an array of three-axis digital magnetic compasses for sensing components of the magnetic field; and
a processor for computing direction vectors, lying in a global X-Y plane that is normal to the central axis, from the sensed components indicating a direction of sensed magnetic field from one of the compasses to the magnetic target, finding intersection points of the direction vectors from the compasses to the target, and determining the in-plane lengths of each direction vector from the compasses to the magnetic target, wherein the processor uses the intersection points and the in-plane lengths to derive a position of the magnetic target relative to the magnetic compasses in the global X-Y plane.

2. The apparatus of claim 1, wherein the intersection is derived from directions of the direction vectors but not magnitudes of the vectors.

3. The apparatus of claim 1, wherein the array further includes an additional digital magnetic compass; and wherein the processor uses measurements from the additional compass to compensate for the Earth's magnetic field and iron effects.

4. The apparatus of claim 1, wherein the magnetic target includes a cylindrical ferromagnetic core and a torroidal magnet surrounding the core.

5. The apparatus of claim 4, wherein the magnetic target further includes a focusing cone about the core and adjacent to the torroidal magnet.

6. The apparatus of claim 5, wherein magnetic target further includes a housing and a spring within the housing for outwardly biasing the torroidal magnet.

7. A method of using the apparatus of claim 1 to perform a manufacturing operation on a non-magnetic structure, the method comprising
from one side of the structure, positioning the magnetic target;
from an opposite side of the structure, moving the array over an expected position of the magnetic target;
using the processor to determine an offset vector between the magnetic target and a reference position;
moving the reference position according to the offset vector; and
performing the manufacturing operation on the structure after the reference position has been moved.

8. A method of locating a hidden feature behind a non-magnetic structure, the method comprising:

placing a magnetic target at the feature, the magnetic target configured to generate a magnetic field that is uniform and concentric about a central axis of the target;

scanning a front of the structure to sense the magnetic field using an array of three-axis digital magnetic compasses;

computing a direction vector indicating a direction of sensed magnetic field, and having a computed length, from each compass to the magnetic target, each direction vector lying in an X-Y plane that is normal to a centerline of the magnetic target;

finding intersection points of the direction vectors; and using the intersection points and the computed lengths to compute an offset vector from the target to a reference point, and using the offset vector to move the reference point, wherein the intersection points are used to derive a position of the target relative to the digital magnetic compasses in the X-Y plane.

9. The method of claim 8, wherein the structure includes aircraft skin, wherein the hidden feature includes a pilot hole in a stiffener behind the aircraft skin; wherein the magnetic target is placed in the pilot hole; and wherein the array is scanned over the front of the aircraft skin.

10. Apparatus comprising:
a magnetic target for generating a magnetic field that is uniform and concentric about a central axis of the target;
an array of three-axis digital magnetic compasses for sensing the magnetic field; and
a processor for finding intersection points of vectors from the compasses to the target, the vectors lying in a global X-Y plane that is normal to the central axis, each vector indicating a direction of sensed magnetic field, and having a computed length, from one of the compasses to the magnetic target, wherein the processor uses the intersection points to compute a position of the magnetic target as a statistical measure of the length of the in-plane vectors.

11. The apparatus of claim 10, wherein the processor determines an offset vector from the target to a reference point.

12. The apparatus of claim 10, wherein each digital magnetic compass includes magnetic sensors for sensing components of the magnetic field along local a-and b-axes, and wherein the components are transformed from the local a- and b-axes to the global X-Y plane.

13. The apparatus of claim 10, wherein the array further includes an additional digital magnetic compass; and wherein the processor uses measurements from the additional compass to compensate for the Earth's magnetic field and iron effects.

14. The apparatus of claim 13, wherein the magnetic target includes a cylindrical ferromagnetic core and a toroidal magnet surrounding the core.

15. The apparatus of claim 14, wherein the magnetic target further includes a focusing cone about the core and adjacent to the toroidal magnet.

16. The apparatus of claim 15, wherein magnetic target further includes a housing and a spring within the housing for outwardly biasing the toroidal magnet.

17. The Apparatus of claim 10, wherein the intersection points are derived from directions of the vectors but not magnitudes of the vectors.

18. Apparatus comprising:
a magnetic target for generating a magnetic field that is uniform and concentric about a central axis of the target;
an array of three-axis digital magnetic compasses for sensing the magnetic field; and
a processor for finding intersection points of vectors from the compasses to the target, the vectors lying in a global X-Y plane that is normal to the central axis, each vector indicating a direction of sensed magnetic field from one of the compasses to the magnetic target, wherein the processor: determines a direction vector for each compass, determines the intersection points from the direction vectors, computes in-plane distances of the target from the intersection points, and computes the position of the target as a statistical measure of the in-plane distances.

19. The apparatus of claim 18, wherein the processor computes a statistical confidence measure of the in-plane distances.

20. The apparatus of claim 18, wherein the processor calculates depth of the magnetic target using the in-plane distances and at least one z-component of magnetic strength.

* * * * *